United States Patent [19]
Sahara et al.

[11] 3,968,402
[45] July 6, 1976

[54] RASTER DISTORTION CORRECTING CIRCUIT

[75] Inventors: Hiroshi Sahara, Tokyo; Tooru Kumagai, Yokohama, both of Japan

[73] Assignee: Sony Corporation, Tokyo, Japan

[22] Filed: Aug. 23, 1974

[21] Appl. No.: 499,974

[30] Foreign Application Priority Data
Aug. 25, 1973 Japan .................... 48-99975[U]

[52] U.S. Cl. ............................. 315/370; 315/400
[51] Int. Cl.² ................................. H01J 29/56
[58] Field of Search .......... 315/370, 371, 399, 400, 315/391, 403

[56] References Cited
UNITED STATES PATENTS

| | | | |
|---|---|---|---|
| 3,571,653 | 3/1971 | Hansen | 315/371 |
| 3,648,099 | 3/1972 | Otten | 315/371 |
| 3,814,982 | 6/1974 | Sakurai et al. | 315/371 |

*Primary Examiner*—Maynard R. Wilbur
*Assistant Examiner*—G. E. Montone
*Attorney, Agent, or Firm*—Lewis H. Eslinger; Alvin Sinderbrand

[57] ABSTRACT

Side, or left and right pin-cushion distortions in the raster of a cathode ray tube, for example, of a color television receiver having an in-line arrangement of its electron beams, are corrected by connecting the horizontal deflection winding of the cathode ray tube, the collector-emitter path of a transistor and the output winding of a saturable reactor, in series, to a power supply source, and by applying to the base or control electrode of the transistor and to the input winding of the saturable reactor a correction signal having a parabolic waveform of the vertical scanning rate or frequency so that correction of the side pin-cushion distortions is effected satisfactorily at all portions of the raster.

7 Claims, 6 Drawing Figures

RASTER DISTORTION CORRECTING CIRCUIT

BACKGROUND OF THE INVENTION

1. Field of the Invention

This invention relates generally to a raster distortion correcting circuit for a cathode ray tube, for example, of a color television receiver.

2. Description of the Prior Art

In a television receiver having a cathode ray tube, a deflection yoke is positioned about the neck of the cathode ray tube, and deflection circuits associated with such deflection yoke cyclically vary currents which are made to flow through windings of the yoke so that the windings generate varying electromagnetic fields by which each electron beam of the cathode ray tube is deflected vertically and horizontally to scan a respective raster on the screen of the cathode ray tube. In general, the raster formed by each electron beam is desired to be substantially rectangular. However, various types of scanning distortions may occur so as to cause the configuration of the generated raster to deviate from the desired rectangular shape. One of the types of raster distortions that may occur is the so-called "pin-cushion" distortion which may appear in respect to the top and bottom or left- and right-hand sides of the raster, and this invention is particularly concerned with providing corrections for the side, or left and right pin-cushion distortions.

Heretofore, such side, or left and right pin-cushion distortions in the raster of a cathode ray tube have been corrected by one or the other of several methods. One of the most frequently employed methods for achieving correction of side pin-cushion raster distortion involves varying or modulating the power supply voltage for the horizontal deflection circuit of the cathode ray tube in accordance with a parabolic wave having the vertical scanning rate or frequency. Another frequently employed method for achieving the foregoing raster correction involves the use of a saturable reactor having an output winding connected in series with the horizontal deflection winding of the yoke and an input winding to which there is applied a correction signal in the form of a parabolic wave having the vertical scanning rate or frequency so that the horizontal deflection current is again varied or modulated by such parabolic wave. Each of the foregoing methods that are frequently employed for correcting side, or left and right pin-cushion distortions in the raster of a cathode ray tube has its inherent advantages and disadvatages, as hereinafter described.

In the case where the power supply voltage for the horizontal deflection circuit is varied or modulated, as aforesaid, the horizontal deflection current $I_h$ flowing through the horizontal deflection winding of the yoke is expressed by the following equation:

$$I_h = \frac{V_{cc}}{L} \cdot t$$

in which $V_{cc}$ is the power supply voltage, $L$ is the inductance value of the deflection winding, and $t$ is time.

It will be apparent from the above equation that, when the power supply voltage $V_{cc}$ is varied or modulated in accordance with a correction signal having a parabolic waveform at the vertical scanning rate, the amplitude of the horizontal deflection current is varied in accordance with such parabolic waveform so that correction of side pin-cushion distortions in the raster is achieved. Such correction of side pin-cushion distortions in the raster is advantageous in that the circuit required therefor is very simple and inexpensive. However, with this method, the horizontal deflection current is varied only at the vertical scanning rate, and not within each horizontal or line scanning period, so that, if a single horizontal scanning line is considered, the same correction is effected adjacent the center and adjacent the opposite or left- and right-hand sides of the screen. The foregoing characteristic of the described method is disadvantageous, particularly when applied to a color cathode ray tube having a wide deflection angle, and the disadvantage, as hereinafter described, is most serious in the case of a color cathode ray tube having an electron gun structure with a so-called in-line arrangement of the plural electron beams issuing therefrom.

In a color cathode ray tube having an electron gun structure with an in-line arrangement of the plural electron beams issuing therefrom, it is desirable that the electromagnetic field for effecting horizontal deflection or scanning of the beams have a pin-cushion shape and that the electromagnetic field for effecting vertical deflection or scanning of the beams have a barrel shape, that is, that the horizontal and vertical deflection fields be non-uniform, so as to correct or compensate for misconvergence of the plural electron beams as the latter are deflected horizontally and vertically from the center of the screen, for example, as disclosed in U.S. Pat. No. 3,500,114, issued Mar. 10, 1970, and having a common assignee herewith. When such non-uniform deflection fields are employed so as to correct or compensate for misconvergence of the electron beams, it has been determined experimentally that correction of side pin-cushion distortions of the raster by means of varying the power supply voltage for the horizontal deflection circuit as mentioned above, is insufficient, particularly in respect to the extent of the correction effected at the central portion of each horizontal scanning line. Therefore, in the case being described, a side pin-cushion distortion may still remain adjacent the central portion of the raster.

On the other hand, when a saturable reactor is employed for correcting side pin-cushion distortions, as aforesaid, such distortions are fully eliminated even near the central portion of the raster by reason of the fact that the inductance value of the output winding of the saturable reactor is varied in response to the correction signal applied to the input winding of the reactor and having a parabolic waveform at the vertical scanning rate, and the inductance value of the output winding of the saturable reactor is also varied at the horizontal scanning rate in response to the horizontal deflection current flowing through such output winding. However, when the side pin-cushion distortions are corrected only by means of the described saturable reactor, the apparatus required for correction of side pin-cushion distortions becomes bulky, heavy and expensive, particularly when applied to a color cathode ray tube having a relatively large deflection angle. Further, when side pin-cushion distortions of the raster are corrected only by means of the described saturable reactor in the case of a color cathode ray tube having a relatively wide deflection angle, it has been found that the desired linearity of the horizontal deflection of the beam or beams if seriously deteriorated.

SUMMARY OF THE INVENTION

Accordingly, it is an object of this invention to provide an improved circuit for correcting side pin-cushion raster distortions which avoids the above mentioned disadvantages inherent in the arrangements previously employed for that purpose.

More specifically, it is an object of this invention to provide a side pin-cushion raster distortion correcting circuit which is relatively small in size and weight and also inexpensive, and which is effective to fully eliminate such distortions near the central portion of the raster as well as near the opposite sides thereof.

Another object is to provide an improved side pin-cushion raster distortion correcting circuit, as aforesaid, which is suitable for a color cathode ray tube with a relatively wide deflection angle.

Still another object is to provide an improved side pin-cushion raster distortion correcting circuit which is particularly adapted for use with a color cathode ray tube having an electron gun structure with a so-called in-line arrangement of the plural electron beams emitted thereby.

In accordance with an aspect of this invention, side pin-cushion distortions in the raster of a cathode ray tube are eliminated by varying or modulating the power supply voltage for the horizontal deflection circuit in accordance with a correction signal having a parabolic waveform at the vertical scanning rate, and by simultaneously applying such correction signal to the input winding of a saturable reactor which has its output winding connected in series with the horizontal deflection winding of the cathode ray tube. By reason of the foregoing arrangement, the horizontal deflection current is modulated in accordance with the parabolic waveform at the vertical scanning rate by the combined action of a transistor or other active element employed for varying or modulating the power supply voltage and of the saturable reactor, and the horizontal deflection current is further modulated in response to the flow of such current through the output winding of the saturable reactor which varies its inductance in accordance with the horizontal deflection current flowing therethrough.

The above, and other objects, features and advantages of the invention, will be apparent in the following detailed description of illustrative embodiments which is to be read in connection with the accompanying drawings.

DETAILED DESCRIPTION OF THE PREFERRED EMBODIMENTS

Figure 1:
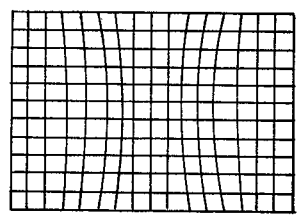
FIG. 1 is a diagrammatic view illustrating the side pin-cushion distortion that may remain near the central portion of the raster on the screen of a cathode ray tube when correction for the side pin-cushion distortion is effected only by varying or modulating the power supply voltage in accordance with a correction signal having a parabolic waveform at the vertical scanning rate.

Referring to the drawings in detail, and initially to FIG. 1 thereof, it will be seen that, when side pin-cushion distortions in the raster of a cathode ray tube are sought to be corrected or removed only by the known method of varying or modulating the power supply voltage for the horizontal deflection circuit in accordance with a parabolic waveform at the vertical scanning rate, the distortion is not fully corrected or removed near the central portion of the raster. Generally, in accordance with this invention, the side pin-cushion distortion of the raster is, for the most part, removed or corrected by varying or modulating the power supply voltage of the horizontal deflection circuit in accordance with a parabolic waveform at the vertical scanning rate, while the side pin-cushion distortion which remains uncorrected near the central portion of the raster is corrected or removed by modulating the horizontal deflection current in accordance with the horizontal scanning rate. Generally, the horizontal deflection current is modulated or varied in accordance with the horizontal scanning rate for removing the side pin-cushion distortion remaining near the central portion of the raster by means of a saturable reactor 1 having its output winding connected in series with the horizontal deflection winding of the cathode ray tube so that the horizontal deflection current, in passing through the output winding of the saturable reactor, will vary the inductance value of such output winding in accordance with the horizontal scanning rate.

Figure 2:
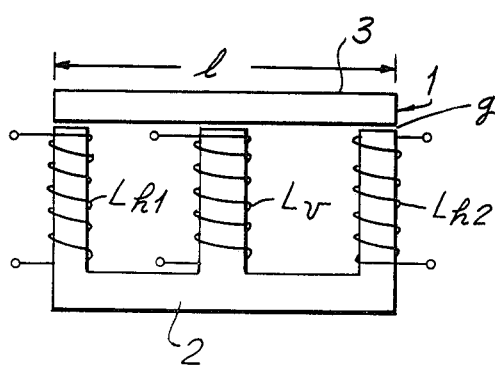
FIG. 2 is a schematic elevational view of a saturable reactor that may be used in a raster distortion correcting circuit according to this invention.

As shown on FIG. 2, the saturable reactor 1 employed in a raster distortion correcting circuit according to this invention may include an E-shaped core 2 and an I-shaped core 3 which are both formed of a magnetically saturable material, and which are arranged relative to each other so that core 3 extends across the free ends of the legs of core 2 with a small gap $g$ therebetween. Saturable reactor 1 further is shown to include an output winding constituted by two windings $Lh_1$ and $Lh_2$ which are respectively wound on the outer legs of core 2, and an input winding $Lv$ wound on the central leg of core 2. The directions in which windings $Lh_1$ and $Lh_2$ are respectively wound on the outer legs of core 2 are selected so that, when such windings are connected in series to constitute the output winding, the compound magnetic fluxes generated by the windings $Lh_1$ and $Lh_2$ in the central leg of core 2 are effective to oppose or cancel each other. Since saturable reactors of the type shown on FIG. 2 are well known, the construction and operation thereof will not be further described. However, it may be noted that the satuable reactor 1 for use in a raster distortion correcting circuit according to this invention may, for example, have a length $l$ of 30mm, 11 turns in each of windings $Lh_1$ and $Lh_2$, 500 turns in input winding $Lv$, and a gap $g$ between cores 2 and 3 of about 50 microns.

Figure 3:
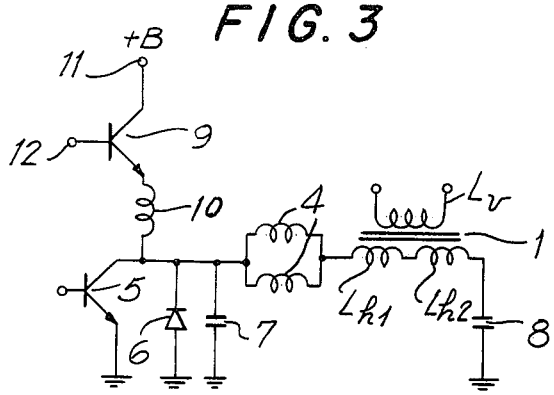
FIG. 3 is a circuit diagram of a basic or simplified raster distortion correcting circuit in accordance with an embodiment of this invention.

Referring now to FIG. 3 in which only the basic or essential components of a circuit according to this invention for correcting or compensating for side pin-cushion distortions of the raster are illustrated, it will be seen that, in such circuit, the windings $Lh_1$ and $Lh_2$ constituting the output winding of saturable reactor 1 are connected in series with the horizontal deflection winding or windings 4 of the deflection yoke of a cathode ray tube. A transistor 5, which forms the output of a horizontal deflection circuit, receives a horizontal driving signal at its base electrode, while the emitter electrode of transistor 5 is connected to ground. The collector electrode of transistor 5 is connected to ground through a parallel circuit of a damper diode 6 and a tuning capacitor 7, and further connected to ground through the series connection of horizontal deflection winding or windings 4, the output winding of saturable reactor 1 and a capacitor 8 which is provided to correct for S-letter distortions. In accordance wtih this invention, an active element 9, shown in the form of a transistor, has its collector-emitter path connected in series with the primary winding 10 of a horizontal output transformer (which is not otherwise illustrated) between a power supply source or terminal 11 to which a positive DC voltage +B is applied, and the collector electrode of transistor 5. The base electrode of transistor 9 is connected to a terminal 12 which receives a correction signal having a parabolic waveform of the vertical scanning rate or frequency, and which may be generated as hereinafter described in detail. Such correction signal having a parabolic waveform of the vertical scanning rate is also applied to input winding $Lv$ of saturable reactor 1.

The raster distortion correcting circuit of FIG. 3 operates as follows:

The correction signal having a parabolic waveform of the vertical scanning rate, when applied to terminal 12, varies the conductance of the collector-emitter path of transistor 9 so that the voltage at the emitter electrode of transistor 9, that is, the power supply voltage for transistor 5 forming the output of the horizontal deflection circuit is varied in accordance with such parabolic waveform. Therefore, the amplitude of the horizontal deflection current attains maximum values during horizontal scanning across the center of the raster or screen, considered in the vertical direction, and is relatively reduced during horizontal scanning across the upper and lower edge portions of the screen so that a correction for side, or left and right pin-cushion distortion is effected.

Figure 4:
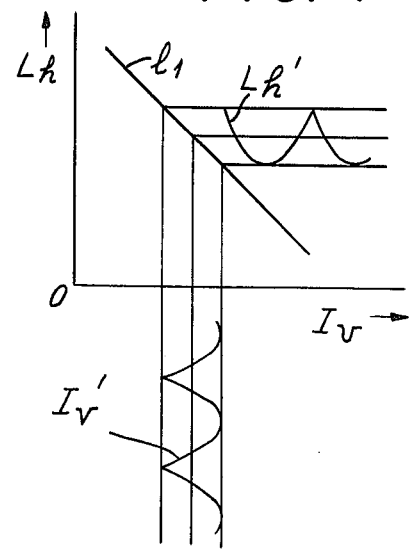
FIGS. 4 and 5 are graphical representations of characteristics of the saturable reactor shown on FIG. 2.

While the above described correction is being effected by the operation of transistor 9, the correction signal having a parabolic waveform of the vertical scanning rate is being simultaneously applied to input winding $Lv$ of saturable reactor 1 having its output winding $Lh_1$, $Lh_2$ connected in series with horizontal deflection winding 4. As indicated by the line $l_1$ on FIG. 4, the compound inductance $Lh$ of the windings $Lh_1$ and $Lh_2$ of saturable reactor 1 has a substantially linear relationship to a DC current $Iv$ which flows through the control or input winding $Lv$ of the saturable reactor. Of course, the value of the compound inductance $Lh$ will become saturated when the current $Iv$ reaches a sufficiently high value (not shown). Therefore, when a correction signal having a parabolic waveform, as indicated at $Iv'$ on FIG. 4, is applied to input winding $Lv$ with an appropriate DC voltage, the value of the compound inductance $Lh$ of output windings $Lh_1$ and $Lh_2$ undergoes a corresponding parabolic variation, as indicated at $Lh'$ on FIG. 4. Since horizontal deflection winding 4 is connected in series with windings $Lh_1$ and $Lh_2$ of the saturable reactor, the horizontal deflection current $Ih$ flowing through horizontal deflection winding 4 is also varied in accordance with the parabolic waveform of the correction signal applied to input winding $Lv$. Therefore, saturable reactor 1 also operates to provide a correction for a side or left and right pin-cushion distortion, which correction is added to that provided by the transistor 9, as previously described.

In the raster distortion correcting circuit according to this invention, the correction for side or left and right pin-cushion distortion is effected mainly by transistor 9, and only to a relatively smaller extent by saturable reactor 1. For example, from 70 to 80% of the required correction may be provided by the operation of transistor 9, while the remaining 30 to 20% of the required correction is provided by saturable reactor 1.

Figure 5:
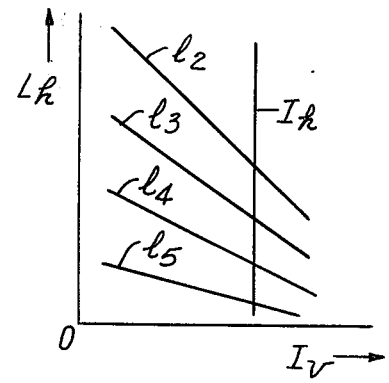

Referring again to FIG. 4, it will be apparent that the linear relationship between the compound inductance $Lh$ of the output windings of saturable reactor 1 and the signal $Iv$ applied to the input winding, as represented by the line $l_1$, assumes that the current through windings $Lh_1$ and $Lh_2$ of the saturable reactor is constant. However, in the circuit according to this invention, as shown on FIG. 3, the connection of windings $Lh_1$ and $Lh_2$ in series with horizontal deflection winding 4 causes the current through windings $Lh_1$ and $Lh_2$ to be equal to the horizontal deflection current $Ih$ which, of course, varies at the horizontal scanning rate so that the $Lh$-$Iv$ characteristic curve of the saturable reactor is also changed in accordance with the varying value or amplitude of the horizontal deflection current $Ih$. More specifically, when the horizontal deflection current $Ih$ increases, the saturable reactor 1 is directed to a more saturated condition, so that the compound or total inductance $Lh$ decreases and the rate of change of the inductance $Lh$ relative to the input current or signal $Lv$ also decreases. For example, on FIG. 5, the lines $l_2$, $l_3$, $l_4$ and $l_5$ represent the $Lh$-$Iv$ characteristics of the saturable reactor 1 for progressively increasing values of the horizontal deflection current $Ih$.

By reason of the foregoing, it will be apparent that the correction or compensation for side pin-cushion distortion provided by saturable reactor 1 is at its maximum when each electron beam is directed at the center of the screen, considered in the horizontal direction, and is relatively reduced when each electron beam is directed toward one or the other of the opposite side edges of the screen. Thus, the side pin-cushion distortion which remains near the central portion of the screen when the power supply voltage for the horizontal deflection circuit is varied in accordance with a parabolic waveform at the vertical scanning rate, as by the transistor 9, may be completely removed by suitably selecting the parabolic waveform and the DC voltage level of the signal $Iv'$ applied to the input winding of saturable reactor 1.

From the foregoing, it will be apparent that, in accordance with the present invention, side pin-cushion distortions are removed by modulating the power supply voltage applied to the collector of transistor 5, as by transistor 9, in accordance with a parabolic waveform at the vertical scanning rate and by similarly modulating the input signal to the winding $Lv$ of saturable reactor 1, while the side pin-cushion distortion near the central portion of the screen is corrected or removed by saturable reactor 1 by reason of the connection of its output winding $Lh_1$, $Lh_2$ in series with the horizontal deflection winding 4.

In theory, the input winding $Lv$ of saturable reactor 1 may have applied thereto merely an appropriate DC voltage, rather than the described correction signal having a parabolic waveform at the vertical scanning rate. In that case, transistor 9 of the circuit shown in FIG. 3 has to be relied upon to provide the full correction for side pin-cushion distortions, while saturable reactor 1 then operates only to correct the pin-cushion distortion which remains near the central portion of the screen or raster. However, it is preferred that the input winding Lv of saturable reactor 1 also receive the correction signal having a parabolic waveform, as explained above, so that the saturable reactor can also operate to provide at least a portion of the correction for the side pin-cushion distortion, and thereby relieve a portion of the load on transistor 9.

When saturable reactor 1 is employed to provide only a portion of the correction for side pin-cushion distortion and to remove the remaining distortion near the center of the screen or raster, as in accordance with this invention, such saturable reactor can be relatively small and light in weight. For example, it has been found that a saturable reactor having a length of 30mm and the other dimensions given above will operate satisfactorily to perform the stated functions in connection with a color cathode ray tube having a screen with a 17 inch diagonal dimension and a 114° deflection angle. On the other hand, if the side pin-cushion distortion for such a color cathode ray tube is to be corrected only by a saturable reactor, rather than by the latter in combination with the modulating transistor 9, as shown on FIG. 3, such saturable reactor would have to be substantially larger, for example, have a length of 50mm, and have a mass or weight that is approximately five times greater than the saturable reactor with a length of 30mm which may be used in accordance with this invention.

Figure 6:
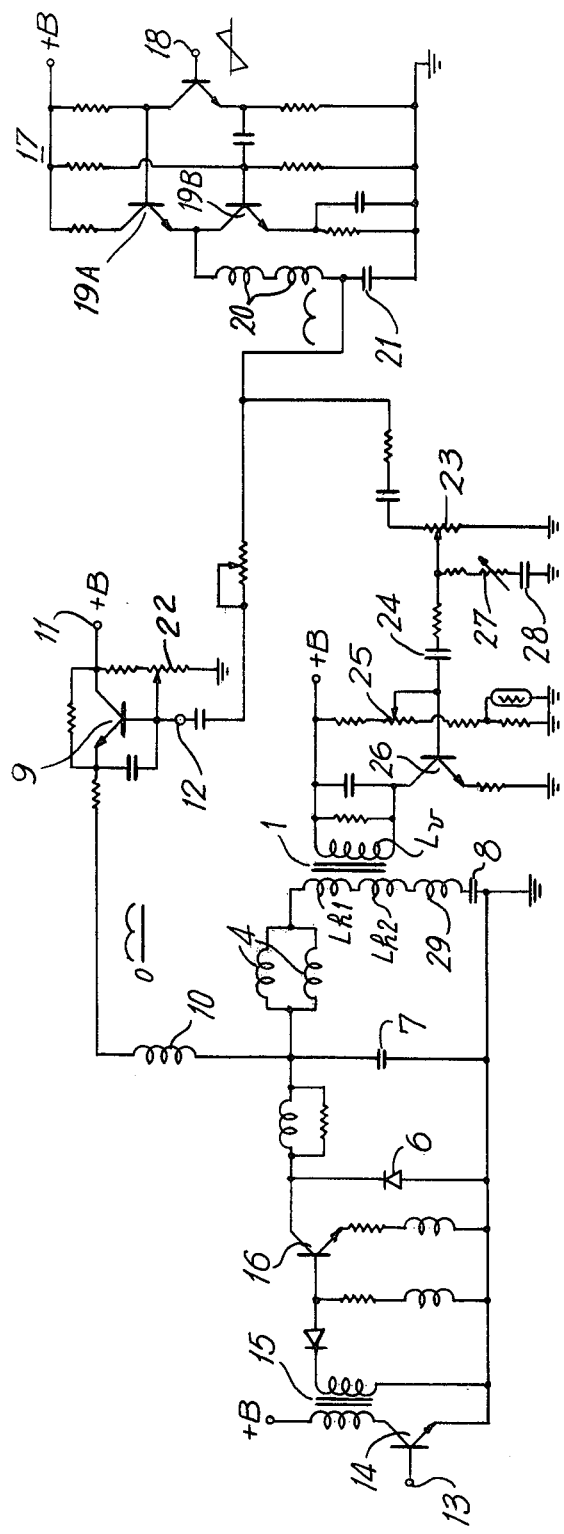
FIG. 6 is a circuit diagram showing a practical application of a raster distortion correcting circuit according to this invention in association with horizontal and vertical deflection circuits of a typical cathode ray tube.

Referring now to FIG. 6 in which circuit elements corresponding to those described above with reference to FIG. 3 are identified by the same reference numerals, it will be seen that a raster distortion correcting circuit according to this invention is there shown associated with typical horizontal and vertical deflection circuits for a cathode ray tube. More specifically, on FIG. 6, the horizontal deflection circuit is shown to include an input terminal 13 which receives horizontal driving pulses, for example, from a horizontal oscillator (not shown), a horizontal driver transistor 14 having its base electrode connected to terminal 13, and a horizontal drive transformer 15 having its primary winding connected in series with the collector-emitter path of transistor 14 between a power supply terminal and ground. The secondary winding of transformer 15 is connected to the control electrode of a semiconductor device 16, for example, to the gate electrode of a GCS (gate controlled switch), as shown, which functions as a horizontal output switching device and corresponds to the transistor 5 on FIG. 3.

The typical vertical deflection circuit 17 illustrated on FIG. 6 is shown to include an input terminal 18 which receives a saw-tooth wave signal at the vertical scanning rate, that is, in synchronism with the vertical synchronizing signal, for example, from a vertical oscillator (not shown), and transistors 19A and 19B which are connected, as shown, to form a single ended, push-pull output amplifier. The vertical deflection winding 20 of the deflection yoke associated with the cathode ray tube and a charge-discharge capacitor 21 are connected in series between the emitter electrode of transistor 19A and ground so that the desired correction signal having a parabolic waveform at the vertical scanning rate is obtained across capacitor 21. Such correction signal is applied to the base electrode of transistor 9 by way of terminal 12 so that transistor 9 will correspondingly modulate the power supply voltage applied to the horizontal output switching device 16, and hence the horizontal deflection current supplied to horizontal deflection winding 4, in the same manner as in the circuit of FIG. 3. In the circuit of FIG. 6, a variable resistor 22 is provided for adjusting the DC bias voltage applied to the base electrode of transistor 9, and thereby controlling the width of the horizontal deflection.

The correction signal having a parabolic waveform obtained across capacitor 21 is also applied to the base electrode of a transistor 26 through a variable resistor 23 and capacitor 24, with the variable resistor 23 serving to control the amplitude of the parabolic waveform as applied to the base electrode of transistor 26. A variable resistor 25 is connected in the base circuit of transistor 26 for adjusting the DC voltage or level of the correction signal having a parabolic waveform as applied to the input winding Lv of saturable reactor 1. A variable resistor 27 and a capacitor 28 are connected in series between the movable tap of variable resistor 23 and the ground so as to form a wave-shaping circuit for the correction signal having a parabolic waveform.

The input winding Lv of the saturable reactor 1 is connected in the collector circuit of transistor 26 so as to receive the correction signal with a parabolic waveform, as adjusted by the elements 23–25, 27 and 28. The output winding $Lh_1$, $Lh_2$ of saturable reactor 1 is connected in series with the horizontal deflection winding 4 and with a coil 29 which is provided to achieve horizontal linearity compensation.

Although the circuit according to this invention for correcting side pin-cushion distortions is shown on FIG. 6 in association with typical horizontal and vertical deflection circuits of a cathode ray tube, which circuits do not appear on FIG. 3, it will be understood that the raster distortion correcting circuit according to this invention, as shown on FIG. 6, operates in the same manner as has been described above with reference to FIG. 3.

Having described specific embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A raster distortion correcting circuit for a television receiver including a cathode ray tube in which at least one electron beam is directed against a screen, a deflection yoke associated with said tube and having horizontal and vertical deflection windings, and horizontal and vertical deflection circuits for supplying horizontal and vertical deflection currents to said horizontal and vertical deflection windings, respectively, so that the resulting magnetic fields cause each said beam to scan horizontally and vertically for forming a raster on the screen: said raster distortion correcting circuit comprising a power supply source for supplying a power supply voltage to said horizontal deflection circuit; an active element having first and second electrodes and a control electrode for varying the effective resistance between said first and second electrodes in dependence on a control signal applied to said control electrode; a saturable reactor having input and output windings, means for generating a correction signal at the vertical scanning rate of said vertical deflection current; circuit means for connecting said first and second electrodes of the active element between said power supply source and said horizontal deflection circuit to connect said active element, said horizontal deflection winding of the yoke and said output winding of the saturable reactor in a series circuit connected to said power supply source; and circuit means for applying said correction signal to said control electrode of the active element as the control signal for the latter and to said input winding of said saturable reactor so that said active element and saturable reactor combine to correct a distortion of said raster over all portions of the latter.

2. A raster distortion correcting circuit according to claim 1; in which said correction signal is generated with a parabolic waveform at said vertical scanning rate for correcting side pin cushion distortions of said raster.

3. A raster distortion correcting circuit according to claim 1; in which said means for generating the correction signal includes a capacitor connected in series with said vertical deflection winding of the yoke, and said circuit means for applying said correction signal extends from between said vertical deflection winding and said capacitor.

4. A raster distortion correcting circuit according to claim 1; in which said active element is a transistor having collector, emitter and base electrodes which constitute said first, second and control electrodes, respectively.

5. A raster distortion correcting circuit according to claim 1; in which said horizontal deflection current is supplied from said horizontal deflection circuit to said series circuit at a location in the latter between said first and second electrodes of said active element and said horizontal deflection winding of the yoke.

6. In a horizontal deflection circuit for a cathode ray tube, including a horizontal deflection current output circuit for supplying horizontal deflection current to a horizontal deflection winding and a source of operating voltage adapted to be supplied to said output circuit, a raster distortion correcting circuit comprising a saturable reactor having an input winding to receive a correction signal whose frequency is equal to the vertical deflection frequency of said cathode ray tube, and an output winding connected in series with said horizontal deflection winding; an active element for supplying said operating voltage to said output circuit; and means for supplying said correction signal to said active element to thereby vary said operating voltage supplied to said output circuit as a function of said correction signal.

7. A raster distortion correcting circuit in accordance with claim 6 wherein said correction signal is generated with a parabolic waveform.

* * * * *